(12) United States Patent
Overby (10) Patent No.: US 7,454,566 B1
(45) Date of Patent: Nov. 18, 2008

(54) SYSTEM AND METHOD FOR ADAPTIVE RAID CONFIGURATION

(75) Inventor: Mark A. Overby, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 275 days.

(21) Appl. No.: 11/135,848

(22) Filed: May 23, 2005

Related U.S. Application Data (60) Provisional application No. 60/676,779, filed on May 2, 2005.

(51) Int. Cl.
*G06F 12/00* (2006.01)

(52) U.S. Cl. .................. 711/114; 711/100; 711/161; 711/162; 714/5; 714/6

(58) Field of Classification Search .................. 711/100, 711/113–114, 144, 161–162, 4; 714/5–6
See application file for complete search history.

(56) References Cited

U.S. PATENT DOCUMENTS

| | | | | |
|---|---|---|---|---|
| 5,568,629 | A * | 10/1996 | Gentry et al. ............... | 711/114 |
| 5,659,704 | A * | 8/1997 | Burkes et al. ............... | 711/114 |
| 5,754,756 | A | 5/1998 | Watanabe et al. | |
| 6,282,619 | B1 * | 8/2001 | Islam et al. ................. | 711/165 |
| 6,510,491 | B1 * | 1/2003 | Franklin et al. ............. | 711/114 |
| 6,609,187 | B1 * | 8/2003 | Merrell et al. .............. | 711/173 |
| 6,834,326 | B1 * | 12/2004 | Wang et al. ................. | 711/114 |
| 6,952,794 | B2 * | 10/2005 | Lu ............................... | 714/7 |
| 6,985,995 | B2 * | 1/2006 | Holland et al. .............. | 711/114 |
| 7,249,278 | B2 | 7/2007 | Fukuda | |
| 2004/0073747 | A1 * | 4/2004 | Lu ............................. | 711/114 |
| 2005/0010722 | A1 * | 1/2005 | Chen ........................... | 711/114 |
| 2005/0066127 | A1 * | 3/2005 | Korgaonkar ................. | 711/114 |
| 2005/0086429 | A1 * | 4/2005 | Chatterjee et al. ........... | 711/114 |
| 2005/0204206 | A1 * | 9/2005 | Arai et al. ..................... | 714/54 |
| 2006/0143379 | A1 * | 6/2006 | Khan et al. .................. | 711/114 |

\* cited by examiner

*Primary Examiner*—Sanjiv Shah
*Assistant Examiner*—Zhuo H Li
(74) *Attorney, Agent, or Firm*—Patterson & Sheridan, LLP (57) ABSTRACT

One embodiment of the present invention includes the steps of determining the optimal RAID level to implement for a given disk drive array, and to the extent applicable, making unallocated disk space available to the user in the form of unprotected disk space. The method efficiently allocates appropriate RAID volumes for the given disk drive array, and, by making the unallocated disk space available to users, allows disk drives of unequal sizes to be effectively used in the disk drive array. Another embodiment of the present invention reconfigures an existing RAID array such that the storage space available on various disk drives in the disk drive array may be used in the most efficient manner. The alternative embodiment is especially useful if an existing RAID array is upgraded by adding a disk drive to, or modified by replacing one or more disk drives in, the existing disk drive array.

14 Claims, 5 Drawing Sheets

SYSTEM AND METHOD FOR ADAPTIVE RAID CONFIGURATION

CROSS-REFERENCE TO RELATED APPLICATIONS

This application claims the priority benefit of U.S. provisional patent application No. 60/676,779, titled "System and Method for Adaptive RAID Configuration," filed May 2, 2005. This related application is hereby incorporated by reference in its entirety.

BACKGROUND OF THE INVENTION

1. Field of the Invention

This invention relates generally to redundant arrays of independent disks (RAIDs) and more specifically to a system and method for adaptive RAID configuration.

2. Description of the Related Art

Conventional RAID arrays (i.e., any disk drive array upon which one or more RAID volumes are extant) are used to provide some degree of data redundancy by trading disk usage efficiency for reliability in the form of data protection. In the simplest RAID case (RAID 1), data is mirrored onto two disk drives to provide 100% data redundancy, but at a cost of being 50% efficient with respect to using available disk space. Other types of RAID arrays (RAID 3 and RAID 5) are designed with three or more disk drives. Having more disk drives typically increases the storage space and efficiency of these types of RAID arrays.

As is commonly known, if disk drives of different sizes are used when configuring a RAID array, then an amount of disk space equal to the storage difference between the disk drives is usually not available to the RAID array. The result is a reduction in the storage efficiency of the RAID array. To illustrate this problem, consider constructing a RAID 1 array from a 100 gigabyte (GB) disk drive and a 150 GB disk drive. The RAID 1 array would consist of two 100 GB partitions (one from each disk drive); however, 50 GB of space would remain unallocated and unavailable to users.

In order to eliminate the problem of unused space, disk drives of identical sizes are often chosen to populate the RAID array. While choosing identical drive sizes may be a workable solution when the RAID array is first assembled, maintaining identical drive sizes may be difficult when modifying or expanding an established array. For example, consider a RAID 5 array initially constructed with three 100 GB disk drives. If one of the disk drives within the array were to fail, and the faulty disk drive could only be replaced with a 150 GB disk drive, then the modified RAID array would use only 100 GB of the available 150 GB from the new disk drive. A space of 50 GB would remain unallocated and unavailable to users. The same would hold true if a fourth disk drive, a 150 GB disk drive, were added to a RAID 5 array initially constructed with three 100 GB disk drives. The resulting four disk drive RAID 5 array would use only 100 GB of the available 150 GB from the additional disk drive. Again, a space of 50 GB would remain unallocated and unavailable to users.

As the foregoing illustrates, what is needed in the art is a way to configure a RAID array having disk drives of different sizes such that the storage efficiency of the RAID array is increased.

SUMMARY OF THE INVENTION

One embodiment of the present invention sets forth a method for adaptively configuring a set of disk drives with a RAID array. The method includes the steps of selecting a RAID type based on a number of disk drives having available storage space, determining a maximum partition size for defining a RAID volume of the selected RAID type, and applying the maximum partition to each of the disk drives having available storage space to define the RAID volume of the selected RAID type. One advantage of the disclosed method is that it efficiently allocates appropriate RAID volumes for the given disk drive array, and, by making the unallocated disk space available to users, allows disk drives of unequal sizes to be effectively used in the disk drive array.

Another embodiment of the present invention reconfigures an existing RAID array such that the storage space available on various disk drives in the disk drive array may be used in the most efficient manner. The alternative embodiment is especially useful if an existing RAID array is upgraded by adding a disk drive to the existing disk drive array or modified by replacing one or more disk drives in the existing disk drive array.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
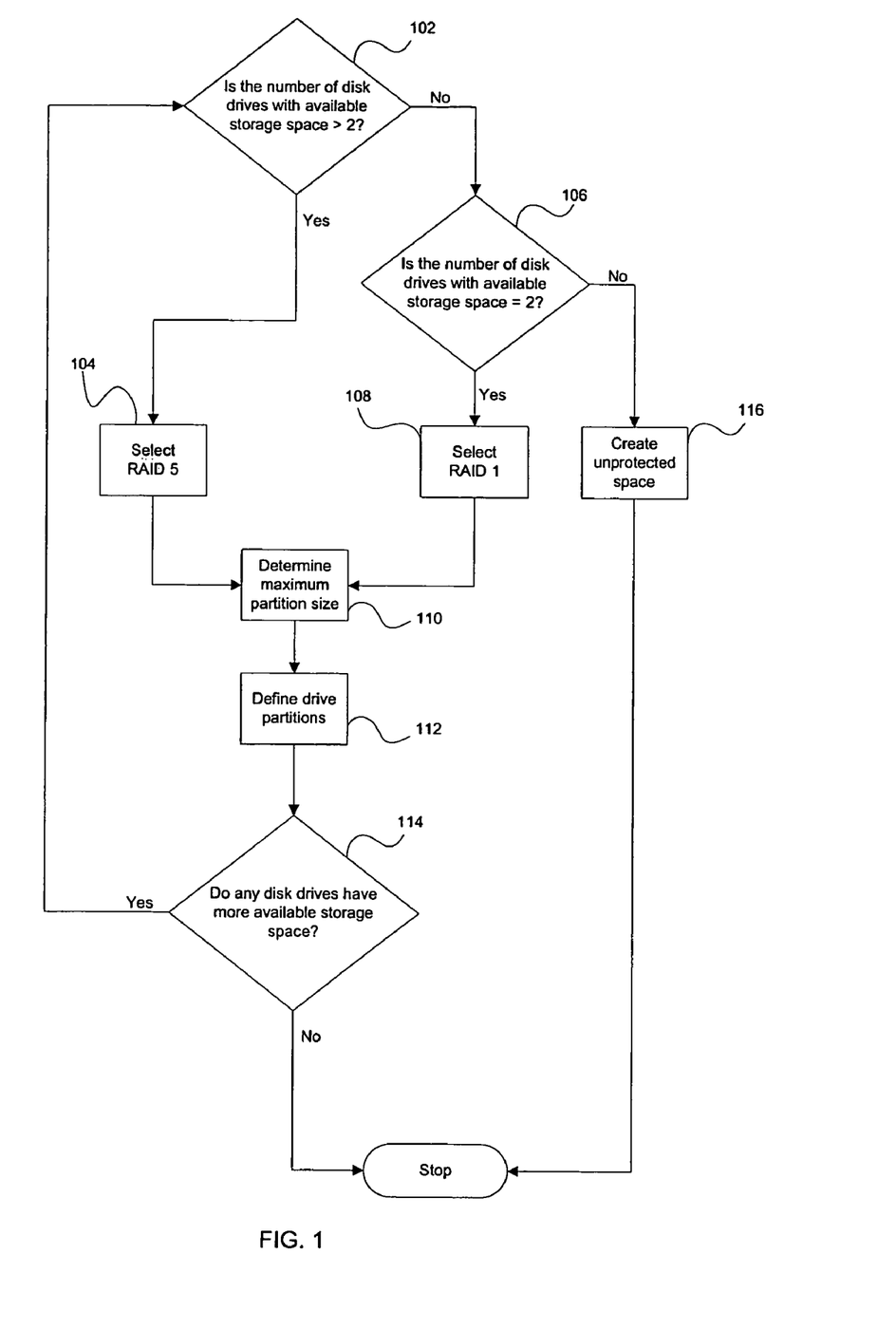
FIG. 1 is a flowchart of method steps for adaptively configuring a RAID volume, according to one embodiment of the present invention.

FIG. 1 is a flowchart of method steps for adaptively configuring a RAID volume, according to one embodiment of the present invention. Persons skilled in the art will understand that any system configured to perform the method steps in any order is within the scope of the invention.

As shown in FIG. 1, the method for adaptively configuring a RAID volume begins in step 102 wherein a RAID manager application determines if there are more than two disk drives with available storage space for use in the RAID volume. If there are more than two disk drives with available storage space, then, in step 104, the RAID manager application selects a RAID 5 configuration for the RAID volume. In step 110, the RAID manager application determines the maximum partition size to allocate on each disk drive having available storage space in order to define the RAID 5 volume. In one embodiment, the maximum partition size is the largest amount of available storage space common to all of the disk drives having available storage space. In step 112, the RAID manager application applies this maximum partition to each disk drive having available storage space to define the RAID 5 volume. In step 114, the RAID manager application determines whether any disk drives have more available storage space. If there is available space on any disk drive, then the method returns to step 102. If there is no more available storage space, then the method terminates.

If, in step 102, the RAID manager application determines that there are not more than two disk drives with available storage space, then, in step 106, the RAID manager application determines whether there are two disk drives with available storage space. If two disk drives have available storage space, then, in step 108, a RAID 1 configuration is selected for the RAID volume. As previously described, in step 110, the RAID manager application determines the maximum partition size for the RAID 1 volume. Again, in one embodiment, the maximum partition size is the largest amount of available storage space common to both disk drives having available storage space. In step 112, the RAID manager application applies this maximum partition to each of the two disk drives to define the RAID 1 volume. The method then proceeds to step 114, as previously described herein.

If, in step 106, the RAID manager application determines that there is only one disk drive with available storage space, then, in step 116, the available storage space on the disk drive is made accessible to the user as unprotected storage space. There is no redundancy associated with this storage region. The unprotected storage space is made visible and accessible to the operating system, and, thus, the user. At the completion of this step, the method terminates.

Figure 2A:
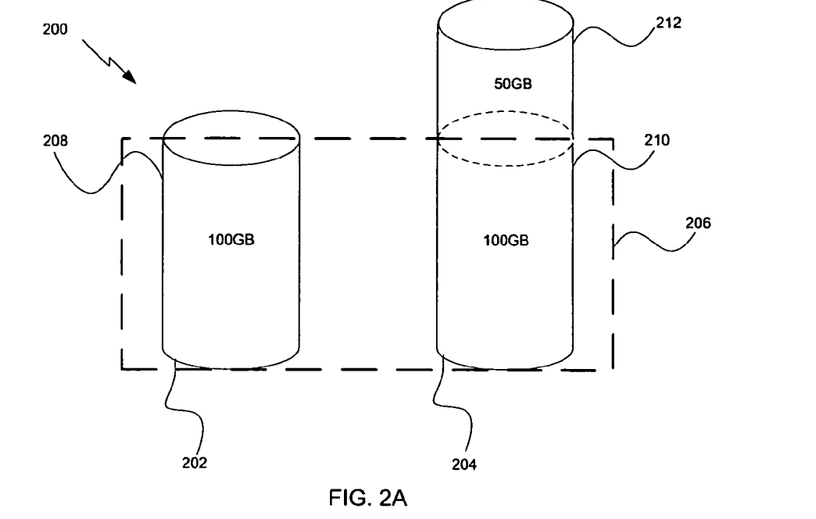
FIG. 2A is a conceptual illustration of how a disk drive array may be configured to implement a RAID 1 volume, according to one embodiment of the present invention.

FIG. 2A is a conceptual illustration of how a disk drive array 200 may be configured to implement a RAID 1 volume 206, according to one embodiment of the present invention. The disk drive array 200 consists of two different sized disk drives 202 and 204. For the purposes of this exemplary discussion, disk drive 202 has a 100 GB capacity and disk drive 204 has a 150 GB capacity; however, the method of FIG. 1 may be applied, without limitation, to disk drives 202 and 204 of any size. The RAID manager application examines the disk drive array 200 and determines that there are only two disk drives 202 and 204 with available storage space. As set forth in steps 102, 106 and 108 of FIG. 1, the RAID manager application therefore selects to configure the disk drive array 200 with a RAID 1 volume. The maximum partition size common to both disk drives 202 and 204 is 100 GB; therefore, as set forth in steps 110 and 112 of FIG. 1, the RAID 1 volume 206 defined on disk drive array 200 consists of two 100 GB partitions 208 and 210. The RAID manager application then examines the disk drive array 200 again, as set forth in step 114 of FIG. 1, and determines that partition 212 of disk 204 is not included in the RAID 1 volume 206. Partition 212 therefore constitutes available storage space. Since the RAID manager application sees that this available space resides on only one disk drive 204, the RAID manager application makes partition 212 visible and accessible as unprotected space to the user, as set forth in steps 102, 106 and 116 of FIG. 1. Because there is then no more available storage space in disk drive array 200 after these steps, the RAID manager application terminates the adaptive RAID configuration process.

The storage capacity of the configured disk drive array 200 is the sum of the effective storage capacities of the RAID 1 volume 206 and the unprotected space 212. Since partition 210 is an exact copy of partition 202, the effective storage capacity of the RAID 1 volume 206 is the size of one partition (i.e. 100 GB). In addition, the effective storage capacity of the unprotected space is 50 GB. Therefore, the complete storage capacity of the configured disk drive array 200 is 150 GB.

Figure 2B:
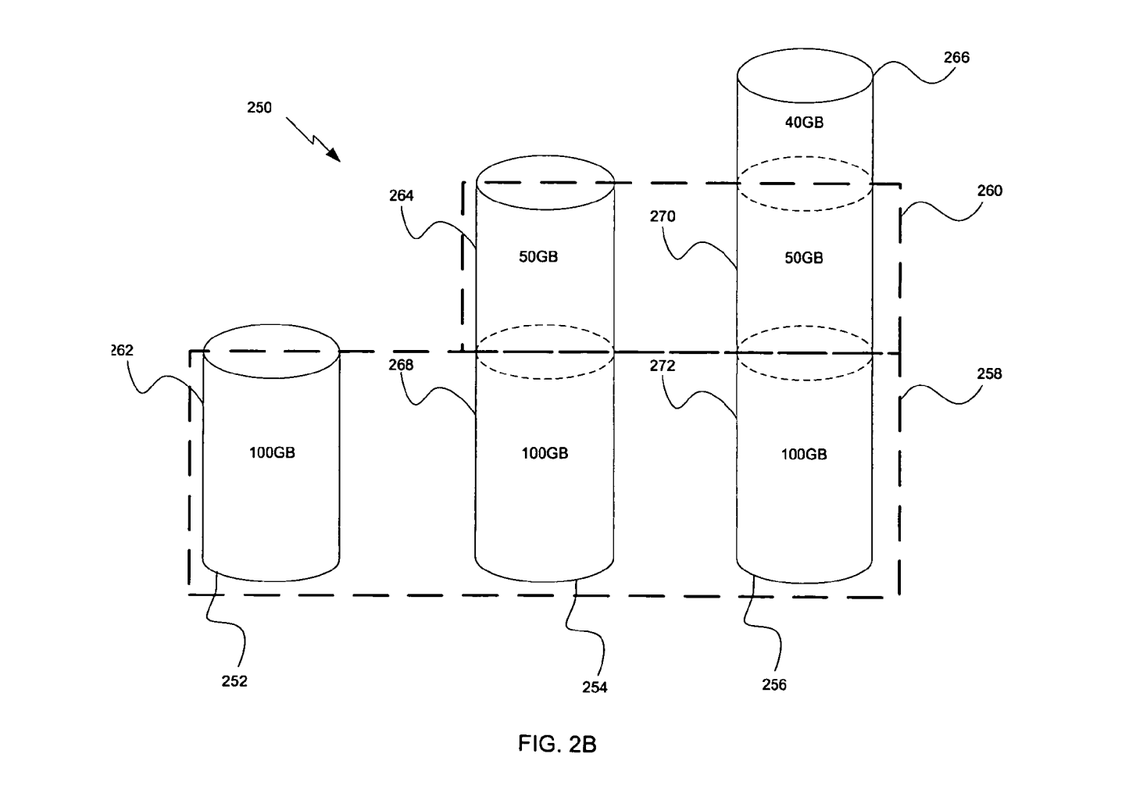
FIG. 2B is a conceptual illustration of how a disk drive array may be configured to implement a RAID 5 volume and a RAID 1 volume, according to one embodiment of the present invention.

FIG. 2B is a conceptual illustration of how a disk drive array 250 may be configured to implement a RAID 5 volume 258 and a RAID 1 volume 260, according to one embodiment of the present invention. For the purposes of this exemplary discussion, the disk drive array 250 consists of three different sized disk drives 252, 254 and 256 having respective sizes 100 GB, 150 GB and 190 GB. Again, however, the method of FIG. 1 may be applied, without limitation, to disk drives 252, 254, and 256 of any size. The RAID manager application examines the disk drive array 250 and determines that there are three disk drives 252, 254, and 256 with available storage space. As set forth in steps 102 and 104 of FIG. 1, the RAID manager application therefore selects to configure the disk drive array 250 with a RAID 5 volume. The maximum partition size common to all three disk drives 252, 254 and 256 is 100 GB. Therefore, as set forth in steps 110 and 112 of FIG. 1, the RAID 5 volume 258 defined on disk drive array 250 consists of three 100 GB partitions 262, 268, and 272. After defining the RAID 5 volume 258, the RAID manager application again examines the disk drive array 250, as set forth in step 114 of FIG. 1, and determines that there is available storage space for another RAID volume on disk drives 254 and 256. The RAID manager application therefore selects to configure disk drives 254 and 256 with a RAID 1 volume, as set forth in step 102, 106 and 108 of FIG. 1. The maximum partition size common to both disk drives 254 and 256 is 50 GB; therefore, the RAID 1 volume 260 defined on disk drives 254 and 256 consists of two 50 GB partitions 264 and 270. The RAID manager application again examines the disk drive array 250, as set forth in step 114 of FIG. 1, and determines that there is a single partition 266 on disk drive 256 of 40 GB that is not included in any RAID volume. The RAID manager application therefore makes partition 266 visible and accessible as unprotected space to the user, as set forth in steps 102, 106 and 116 of FIG. 1.

The storage capacity of the configured disk drive array 250 is the sum of the effective storage capacities of RAID 5 volume 258, RAID 1 volume 260 and the unprotected space 266. RAID 5 volume 258 comprises three partitions, each 100 GB in size. As a general rule, the effective storage capacity for a RAID 5 volume is determined by the formula $C=(N-1)X$, where C is the storage capacity, N is the number of partitions and X is the size of each of those partitions. Applying this formula to RAID 5 volume 258 shows its effective storage capacity to be 200 GB. RAID 1 volume 260 has an effective storage capacity of 50 GB, as determined by the size of the partitions 264 and 270, and the effective storage capacity of the unprotected space 266 is 40 GB. The complete storage capacity of the configured disk drive array 250 is therefore 290 GB.

As previously discussed herein, the method of FIG. 1 is not limited to the disk drive arrays shown in FIGS. 2A and 2B. The method may be used in conjunction with any disk drive array comprising any number of disk drives. Thus, the combination of RAID 5 and RAID 1 volumes and unprotected space described above in conjunction with FIGS. 2A and 2B in no way limits the scope of the present invention.

Figure 3A:
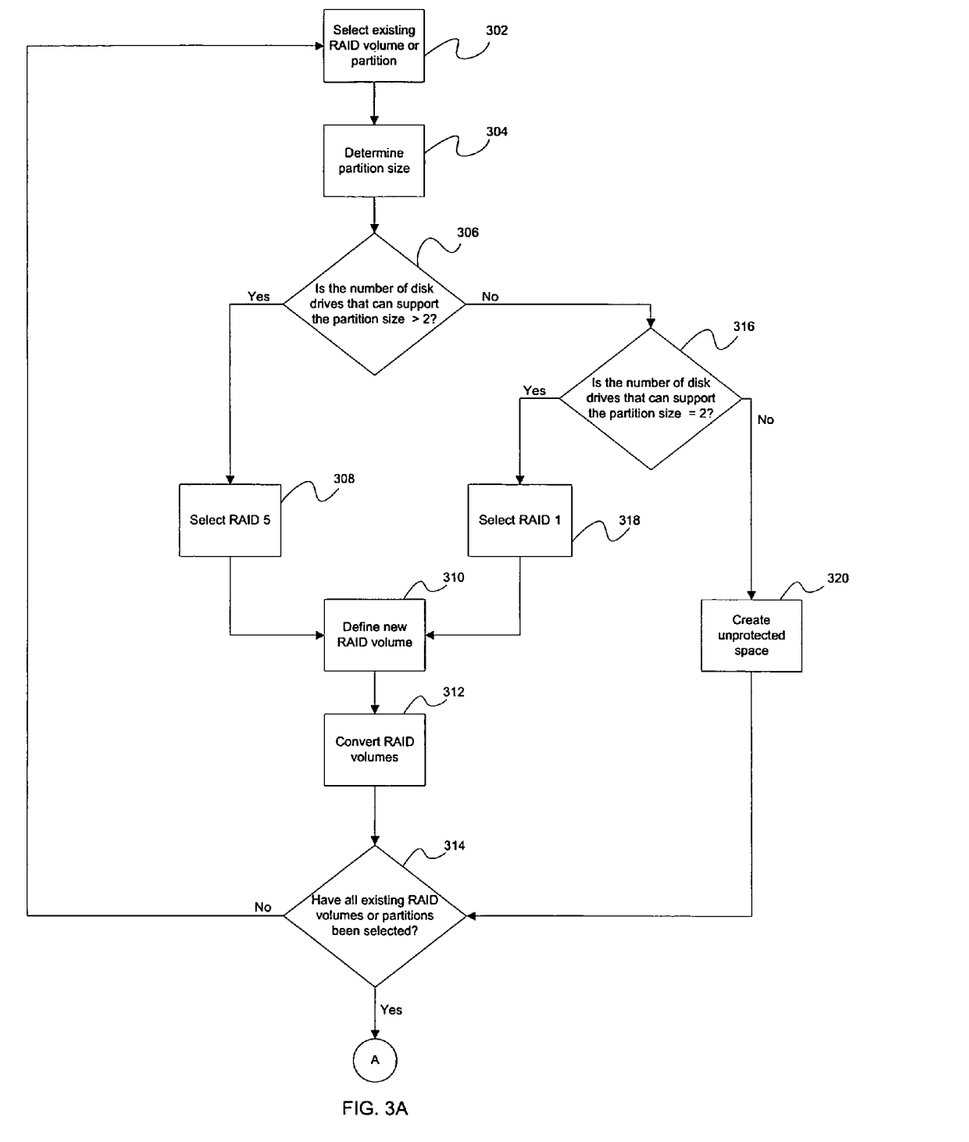
FIGS. 3A and 3B present a flowchart of method steps for adaptively reconfiguring an existing RAID array, according to one embodiment of the present invention.
Figure 3B:
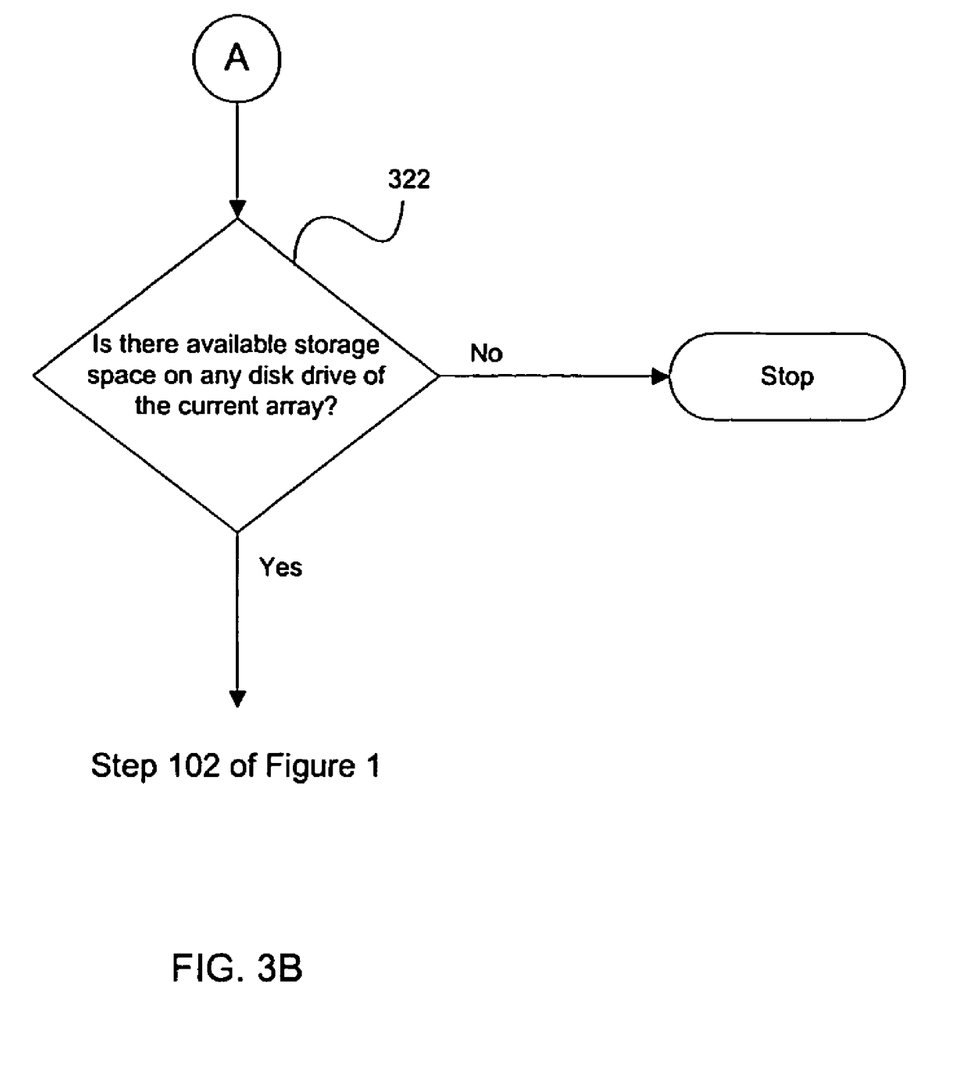

The method of FIG. 1 may be applied to initially configure any disk drive array to create a RAID array, as described in FIGS. 2A and 2B. In addition, if a disk drive array is already configured with a RAID array, the method may be used, in part, to reconfigure the existing RAID array such that the storage space available on various disk drives in the disk drive array may be used in the most efficient manner. FIGS. 3A and 3B set forth a method of reconfiguring a existing RAID array that is especially useful if an existing RAID array is upgraded by adding a disk drive to the existing disk drive array or modified by replacing one or more disk drives in the existing disk drive array.

FIGS. 3A and 3B present a flowchart of method steps for adaptively reconfiguring a RAID array, according to one embodiment of the present invention. Persons skilled in the art will understand that any system configured to perform the method steps in any order is within the scope of the invention.

As shown in FIGS. 3A and 3B, the method for adaptively reconfiguring an existing RAID array begins in step 302 wherein the RAID manager application selects an existing RAID volume or partition from the RAID array. A partition may include any partition that is not a member of an existing RAID volume, unprotected storage space or unused storage space. The RAID manager application determines the partition size of the selected RAID volume or partition in step 304.

In step 306, the RAID application manager determines if there are more than two disk drives available in the current disk drive array that can support the partition size of the selected RAID volume or partition. The current disk drive array may be the array of disk drives on which the existing RAID array is configured or the array of upgraded or modified disk drives (in the case where a disk drive is added to an existing disk drive array or where one or more disk drives in the existing disk drive array are replaced). In one embodiment, the number of available disk drives that can support the partition size of the selected RAID volume or partition is the number of disk drives in the selected RAID volume or partition plus the number of disk drives in the current disk drive array that are not members of the selected RAID volume or partition but can nonetheless support the partition size of the selected RAID volume or partition.

If more than two disk drives are available, then, in step 308, the RAID manager application selects a RAID 5 configuration for the updated RAID volume. In step 310, the RAID manager application updates the RAID volume on the current disk drive array. The RAID volume includes the existing partition(s) of the selected RAID volume or partition plus an identically sized partition on each disk drive in the current disk drive array that is not a member of the selected RAID volume or partition but can nonetheless support the partition size of the selected RAID volume or partition. In this fashion, the RAID manager application reuses the existing partition(s) of the selected RAID volume or partition to construct the updated RAID array.

In step 312, the data from the selected RAID volume or the selected partition is converted to the updated RAID volume. The conversion of step 312 is well known in the art. In one embodiment, the RAID manager application determines the optimal stripe size for the updated RAID volume by evaluating the selected RAID volume or partition. Data is read from the selected volume or partition and is written temporarily to memory. The RAID manager application then reads the data from memory and writes the data to the updated RAID volume. As is well-known, care should be taken to read data well ahead on the existing RAID volume so that, as data is written to the updated RAID volume, the RAID manager application does not overwrite data on the existing RAID volume. Any selected RAID volume or partition may be converted. For example, a selected RAID 3 or RAID 5 volume may be converted into an updated RAID 5 volume when one or more partitions are added to the selected RAID 3 or RAID 5 volume. Similarly, a selected RAID 1 volume may be converted into an updated RAID 5 volume by adding one or more partitions, and existing unprotected space may be converted into a RAID 1 volume by adding one partition.

After converting the RAID volumes, the RAID manager application, in step 314, determines whether all of the RAID volumes or partitions of the existing RAID array have been selected. If there are any existing RAID volumes or partitions left to select, then the method returns to step 302. If, however, all of the existing RAID volumes or partitions have been selected, then the method proceeds to step 322. In step 322, the RAID manager application determines whether there is any available storage space on any of the disk drives of the current disk drive array. If there is no available storage space, then the method terminates. However, if there is available storage space, then the method proceeds to step 102 of FIG. 1.

If, in step 306, the RAID manager application determines that there are not more than two disk drives in the current disk drive array that can support the partition size of the selected RAID volume or partition, then, in step 316, the RAID manager application determines whether there are two disk drives that can support the partition size of the selected RAID volume or partition. If the RAID manager application determines that there are two such disk drives, then, in step 318, a RAID 1 configuration is selected for the updated RAID volume. As previously described, in step 310, the RAID manager application defines the updated RAID volume on the disk drives of the current disk drive array, and, in step 312, the RAID manager application converts the data from the selected RAID volume or partition to the updated RAID 1 volume. The method then proceeds to step 314, as previously described herein.

If, in step 316, the RAID manager application determines that there is only one disk drive in the current disk drive array that can support the partition size of the selected RAID volume or partition, then the selected RAID volume or partition is a partition, and the method proceeds to step 320. In step 320, the RAID manager application creates unprotected storage space by defining a partition on the one disk drive having the same size as the selected partition. The partition of unprotected space is made visible and accessible to the user. The method then proceeds to step 314, as previously described herein.

The method of FIGS. 3A and 3B may be applied to any existing RAID volume, whether or not that RAID volume is upgraded or modified. For example, suppose an existing RAID 1 volume is comprised of two disk drives of different sizes such that one of the disk drives contains a certain amount of unused storage space outside of the RAID 1 volume. The method of FIGS. 3A and 3B may be applied to this RAID 1 volume to convert that unused storage space to unprotected storage space that is accessible and visible to the user.

The method of FIGS. 3A and 3B also may be used to reconfigure an existing RAID array that is upgraded by adding a disk drive to the existing disk drive array. For example, suppose the RAID array comprising RAID 1 volume 206 and unprotected space 212, as shown in FIG. 2A, is upgraded by adding a third disk drive to the existing disk drive array 200. Suppose further that this third disk drive has a storage capacity of 190 GB.

To reconfigure the RAID array of FIG. 2A, the RAID manager application first examines the RAID array of FIG. 2A and selects an existing RAID volume or partition in that RAID array, as set forth in step 302 of FIGS. 3A and 3B. By way of example only, assume that the RAID manager application selects RAID 1 volume 206 comprised of partitions 208 and 210. The RAID manager application determines that the partition size of RAID 1 volume 206 is 100 GB and then inspects the current disk drive array, consisting of disk drives 202, 204 and the 190 GB disk drive, and determines that all three disk drives in the current disk drive array can support the 100 GB partition size, as set forth in steps 304 and 306 of FIGS. 3A and 3B. Since three disk drives can support the partition size, the RAID manager application selects a RAID 5 configuration for the updated RAID volume, as set forth in step 306 and 308 of FIGS. 3A and 3B. The RAID manager application defines the updated RAID 5 volume by defining a 100 GB partition on each of disk drives 202, 204 and the 190 GB disk drive, as set forth in step 310 of FIGS. 3A and 3B. The RAID manager application then converts the data from RAID 1 volume 206 to the updated RAID 5 volume, using any migration technique known in the art, as set forth in step 312 of FIGS. 3A and 3B.

The RAID manager application then re-examines the RAID array of FIG. 2A to determine whether all existing RAID volumes or partitions in the RAID array have been selected, as set forth in step 314 of FIGS. 3A and 3B. Since partition 212 has not yet been selected, the RAID manager application selects partition 212, as set forth in step 302 of FIGS. 3A and 3B. The RAID manager application determines that the partition size of partition 212 is 50 GB, as set forth in step 304 of FIGS. 3A and 3B. Since after defining the updated RAID 5 volume only two disk drives of the current disk drive array can support the 50 GB partition size, disk drive 204 and the 190 GB disk drive, the RAID manager application selects a RAID 1 configuration for the updated RAID volume, as set forth by steps 306, 316 and 318 of FIGS. 3A and 3B. The RAID manager application defines the updated RAID 1 volume by defining a 50 GB partition on each of disk drive 204 and the 190 GB disk drive, as set forth in step 310 in FIGS. 3A and 3B. The RAID manager application then converts the data from partition 212 to the updated RAID 1 volume, as set forth in step 312 of FIGS. 3A and 3B.

The RAID manager application then re-examines the RAID array of FIG. 2A to determine whether all existing RAID volumes or partitions in the RAID array have been selected, as set forth in step 314 of FIGS. 3A and 3B. Since both RAID 1 volume 206 and partition 212 have already been selected, the RAID manager examines the current disk drive array to determine whether there are any disk drives with available storage space, as set forth in step 322 of FIGS. 3A and 3B. Since the 190 GB disk drive has 40 GB of available storage space, the RAID manager application creates a partition of 40 GB of unprotected storage space on the 190 GB disk drive that is visible and accessible to the user, as set forth in steps 102, 106 and 116 of FIG. 1. After creating the unprotected storage space, there is no more available storage space on any of the disk drives in the current disk drive array, so the RAID volume manager terminates the method.

The resulting RAID array is the same as the RAID array shown in FIG. 2B, where the updated RAID 5 volume is depicted as RAID 5 volume 258, the updated RAID 1 volume is depicted as RAID 1 volume 260, and the new unprotected storage space is depicted by unprotected space 266. The storage capacity of reconfigured RAID array is the sum of the updated RAID 5 volume (200 GB), the updated RAID 1 volume (50 GB) and the unprotected storage space (40 GB), which is equal to 290 GB of storage space.

Figure 4:
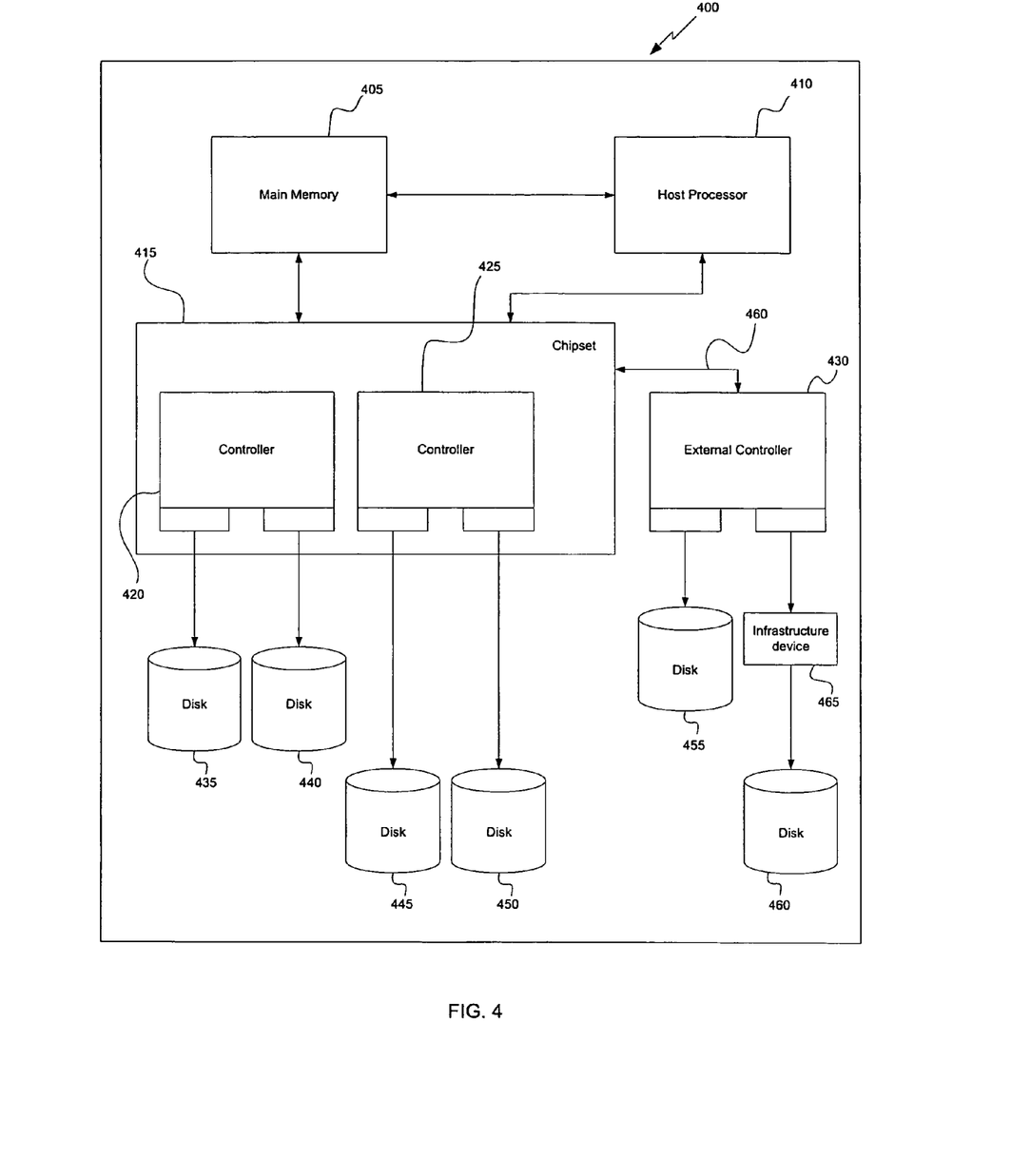
FIG. 4 is a conceptual illustration of a computer system configured to implement one or more aspects of the present invention.

FIG. 4 is a conceptual illustration of a computer system 400 configured to implement one or more aspects of the present invention. Computer system 400 may be a desktop computer, server, laptop computer, palm-sized computer, personal digital assistant, tablet computer, game console, cellular telephone, computer-based simulator or any other type of similar computing device. As shown, computer system 400 may include, without limitation, a host processor 410, main memory 405, a chipset 415, an external disk drive controller 430, an disk drive infrastructure device 465, a bus 465, and disk drives 435, 440, 445, 450, 455, and 460.

Computer system 400 uses main memory 405 to store programs such as the RAID manager application, described above in conjunction with FIGS. 1-3, and data used by the host processor 410. The host processor 410 runs the RAID manager application and uses the chipset 415 to control and access the disk drives 435, 440, 445, 450. The external disk drive controller 430 may be connected to the chipset 415 by a bus 460. The RAID manager application may control disk drive 455 though the external disk drive controller 430 and disk drive 460 through the external disk drive controller 430 and the disk drive infrastructure device 465. Those skilled in the art will recognize that any number of disk drives may be coupled to computer system 400 using the disk drive infrastructure device 465.

In one embodiment of the present invention, the RAID manager application is a stand alone application. In an alternative embodiment, the RAID manager application is part of the operating system. Persons skilled in the art will understand that the functionality of the RAID manager application may be carried out by software, firmware, hardware or any combination thereof.

While the foregoing is directed to embodiments of the present invention, other and further embodiments of the invention may be devised without departing from the basic scope thereof, and the scope thereof is determined by the claims that follow.

The invention claimed is:

1. A method for adaptively reconfiguring a set of disk drives to implement a reconfigured RAID array comprising RAID 1 and RAID 5 data, wherein at least a subset of the set of disk drives is originally configured to implement an original RAID array comprising RAID 1 data, at least part of the data stored in the original RAID array being migrated into the reconfigured RAID array by converting the data, the method comprising:
   identifying a first RAID volume of a first RAID type that is associated with the original RAID array, including:
      selecting a RAID type based on a number of disk drives in the set of disk drives having available storage space, including selecting drives that are a part of the original RAID array;
      determining a maximum partition size for the RAID type,
      determining that the number of disk drives having available storage space is greater than two so that the RAID type is RAID 5;
   applying the maximum partition size to each of the disk drives having available storage space to define the reconfigured RAID volume for storing data in RAID 5, including disk drives that are members of the original RAID array, to establish a RAID 5 partition on each disk drive of the reconfigured RAID array; and
   migrating the data from the original RAID array into portions of the reconfigured RAID array, including converting data stored in the original RAID array in RAID 1 format to a RAID 5 format consistent with the reconfigured RAID array, while converting selected partitions on disk drives from the original RAID array into partitions on the disk drives in the reconfigured RAID array.

2. The method of claim 1, wherein the first RAID volume is a RAID 1 volume, and the step of migrating includes converting the RAID 1 volume into a RAID 5 volume.

3. The method of claim 2, wherein the step of migrating further includes selecting a stripe size.

4. The method of claim 1, wherein the step of migrating further includes selecting a stripe size.

5. The method of claim 1, further comprising the step of creating unprotected storage space, if the number of disk drives having available storage space is equal to one.

6. A computer-readable medium storing instructions for causing a computing device to adaptively reconfigure a set of disk drives to implement a reconfigured RAID array comprising RAID 1 and RAID 5 data, wherein at least a subset of the set of disk drives is originally configured to implement an original RAID array comprising RAID 1 data, at least part of the data stored in the original RAID array being migrated into the reconfigured RAID array by converting the data, by performing the steps of:

identifying a first RAID volume of a first RAID type that is associated with the original RAID array, including:
selecting a RAID type based on a number of disk drives in the set of disk drives having available storage space, including selecting drives that are a part of the original RAID array;
determining a maximum partition size for the RAID type,
determining that the number of disk drives having available storage space is greater than two so that the RAID type is RAID 5;
applying the maximum partition size to each of the disk drives having available storage space to define the second reconfigured RAID volume for storing data in RAID 5, including disk drives that are members of the original RAID array, to establish a RAID 5 partition on each disk drive of the reconfigured RAID array; and
migrating the data from the original RAID array into portions of the reconfigured RAID array, including converting data stored in the original RAID array in RAID 1 format to a RAID 5 format consistent with the reconfigured RAID array, while converting selected partitions on disk drives from the original RAID array into partitions on disk drives in the reconfigured RAID array.

7. The computer-readable medium of claim 6, wherein the first RAID volume is a RAID 1 volume, and the step of migrating includes converting the RAID 1 volume into a RAID 5 volume.

8. The computer-readable medium of claim 6, wherein the original RAID array is a RAID 3 volume or a RAID 5 volume, and the step of migrating includes converting the data in the RAID 3 volume or the RAID 5 volume comprising the original RAID array into RAID 5 data.

9. The computer-readable medium of claim 6, including selecting a RAID type comprising a RAID 1 type, if the number of disk drives having available storage space is equal to two, and identifying unprotected or unused storage space on one disk drive of the original RAID array, and the step of migrating includes converting the unprotected or unused storage space into a RAID 1 volume.

10. The computer-readable medium of claim 6, further comprising the step of creating unprotected storage space, if the number of disk drives having available storage space is equal to one.

11. A system for adaptively reconfiguring a set of disk drives to implement a reconfigured RAID array comprising RAID 1 and RAID 5 data, wherein at least a subset of the set of disk drives is originally configured to implement an original RAID array comprising RAID 1 data, at least part of the data stored in the original RAID array being migrated into a second the reconfigured RAID array by converting the data, the system comprising:

a memory; and
a processor configured to perform the steps of:
identifying a first RAID volume of a first RAID type that is associated with the original RAID array, including:
selecting a RAID type based on a number of disk drives in the set of disk drives having available storage space, including selecting drives that are a part of the original RAID array,
determining a maximum partition size for the RAID type,
determining that the number of disk drives having available storage space is greater than two so that the RAID type is RAID 5;
applying the maximum partition size to each of the disk drives having available storage space to define the reconfigured RAID volume for storing data in RAID 5, including disk drives that are members of the original RAID array, to establish a RAID 5 partition on each disk drive of the reconfigured RAID array, and
migrating the data from the original RAID array into portions of the reconfigured RAID array including converting data stored in the original RAID array in RAID 1 format to a RAID 5 format consistent with the reconfigured RAID array, while converting selected partitions on disk drives from the original RAID array into partitions on the disk drives in the reconfigured RAID array.

12. The system of claim 11, wherein the first RAID volume is a RAID 3 volume or a RAID 5 volume, the step of selecting a second RAID type comprises selecting a RAID 5 type, if the number of disk drives having available storage space is greater than two, and the step of morphing includes converting the RAID 3 volume or the RAID 5 volume comprising the first RAID volume into a RAID 5 volume comprising the second RAID volume.

13. The system of claim 11, wherein the step of identifying a first RAID volume comprises identifying unprotected or unused storage space on one disk drive of the first RAID array, the step of selecting a second RAID type comprises selecting a RAID 1 type, if the number of disk drives having available storage space is equal to two, and the step of migrating comprises converting the unprotected or unused storage space into a RAID 1 volume.

14. The system of claim 11, further comprising the step of creating unprotected storage space, if the number of disk drives having available storage space is equal to one.

* * * * *

UNITED STATES PATENT AND TRADEMARK OFFICE
CERTIFICATE OF CORRECTION

PATENT NO. : 7,454,566 B1
APPLICATION NO. : 11/135848
DATED : November 18, 2008
INVENTOR(S) : Mark A. Overby

It is certified that error appears in the above-identified patent and that said Letters Patent is hereby corrected as shown below:

In Column 9, Lines 32 and 33 replace "the second reconfigured" with --the reconfigured--.

In Column 10, Line 10 and 11 replace "into a second the reconfigured" with --into the reconfigured--.

Signed and Sealed this

Third Day of February, 2009

JOHN DOLL
*Acting Director of the United States Patent and Trademark Office*